United States Patent
Rodriguez Mauricio et al.

(10) Patent No.: US 11,673,445 B2
(45) Date of Patent: Jun. 13, 2023

(54) POWERTRAIN PROACTIVE DAMPING SYSTEM USING MAGNETO RHEOLOGICAL MATERIALS

(71) Applicant: Continental Automotive Systems, Inc., Auburn Hills, MI (US)

(72) Inventors: Jorge de Jesus Rodriguez Mauricio, Zapopan (MX); Cesar Alejandro Santana Castaneda, Guadalajara (MX); Luis Javier Del Real Ibanez, Rochester, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 721 days.

(21) Appl. No.: 16/526,123

(22) Filed: Jul. 30, 2019

(65) Prior Publication Data

US 2021/0031584 A1   Feb. 4, 2021

(51) Int. Cl.
*B60G 17/0165* (2006.01)
*B60G 17/015* (2006.01)
*B60G 17/019* (2006.01)
*B60K 5/12* (2006.01)
*B60G 13/12* (2006.01)
(Continued)

(52) U.S. Cl.
CPC ......... *B60G 17/0165* (2013.01); *B60G 13/12* (2013.01); *B60G 17/0152* (2013.01); *B60G 17/01908* (2013.01); *B60K 5/1208* (2013.01); *F16F 1/361* (2013.01); *F16F 1/3615* (2013.01); *G01S 17/931* (2020.01); *B60G 2202/24* (2013.01); *B60G 2400/10* (2013.01); *B60G 2401/00* (2013.01); *F16F 2224/025* (2013.01); *F16F 2228/066* (2013.01); *F16F 2230/18* (2013.01)

(58) Field of Classification Search
CPC .... B60G 17/0165; F16F 1/361; F16F 1/3615; F16F 2224/025; F16F 2228/066
See application file for complete search history.

(56) References Cited

U.S. PATENT DOCUMENTS 7,584,685 B2   9/2009 Crist
8,807,543 B2   8/2014 Loheide et al.
(Continued)

FOREIGN PATENT DOCUMENTS

EP       1284373 A1 *   2/2003   ............... F16F 1/361
KR   10-1573436 B1 * 12/2015   ............... B60K 5/12

*Primary Examiner* — James A English

(57) ABSTRACT

A vehicle powertrain proactive damping system includes a plurality of proactive damping structures mounted on a powertrain structure with each proactive damping structure includes a magneto rheological elastomer (MRE). An electromagnet is associated with each proactive damping structure. A control unit includes a processor circuit. A sensor obtains vibration data regarding the powertrain structure. A LIDAR sensor is mounted on the vehicle and is electrically connected with the control unit. The LIDAR sensor provides data to the control unit indicative of upcoming road surface conditions to be experienced by the vehicle. Based on data from at the sensor and the LIDAR sensor, the processor circuit is constructed and arranged to control voltage to the electromagnets to selectively adjust a rigidity of the associated proactive damping structure so as to control vibrational effects on the powertrain structure.

11 Claims, 5 Drawing Sheets

(51) Int. Cl.
  *F16F 1/36* (2006.01)
  *G01S 17/931* (2020.01)

(56) References Cited

U.S. PATENT DOCUMENTS

| | | | |
|---|---|---|---|
| 2005/0011710 A1* | 1/2005 | Hitchcock | F16F 1/361 188/267.2 |
| 2017/0136842 A1* | 5/2017 | Anderson | B60N 2/501 |
| 2018/0112710 A1* | 4/2018 | Considine | F16C 32/0629 |
| 2019/0025813 A1* | 1/2019 | Cella | G06Q 30/0278 |
| 2019/0154098 A1* | 5/2019 | Inoue | F16F 1/361 |
| 2020/0263751 A1* | 8/2020 | Ito | F16F 13/305 |
| 2020/0269672 A1* | 8/2020 | Ito | B60K 5/1216 |

* cited by examiner

POWERTRAIN PROACTIVE DAMPING SYSTEM USING MAGNETO RHEOLOGICAL MATERIALS

FIELD

This invention relates to vehicle damping and, more particularly, to a proactive damping system for a vehicle powertrain, including chassis and suspension components, using magneto rheological elastomers.

BACKGROUND

Low to medium load capacity vehicles usually work under critical conditions such as rough pavement, debris, excessive loads that reduce the lifespan of the mechanical components in the suspension and chassis including joints, bearings, transmission rods since these components are exposed to such conditions.

Conventional Magneto Rheological Elastomers (MRE) include a wide variety of composite materials, which typically consist of magnetically polarizable particles in a non-magnetic solid or gel-like medium. Particles inside the elastomer or gel can be homogeneously distributed or they can be grouped to form chain-like columnar structures. The behavior of the MRE is shown to have controllable and field-dependent shear modulus. The solid matrix prevents iron particles from settling with time which is the opposite in case of Magneto Rheological Fluids.

As disclosed in U.S. Pat. No. 7,584,685, an MRE has been used as a vibration damper for a rotating shaft, such as a crankshaft. Sensors monitor engine and combustion performance to indirectly determine the vibration damping that is necessary. A controller energizes an electromagnet to provide a magnetic field to the MRE to provide damping to the crankshaft, based on the sensor data. Thus, only reactive damping is provided.

Thus, there is a need to provide a proactive damping system for vibration damping of a vehicle powertrain, including a chassis and a suspension, using magneto rheological elastomers.

SUMMARY

An object of an embodiment is to fulfill the need referred to above. In accordance with the principles of an embodiment, this objective is obtained by providing a vehicle powertrain proactive damping system. The system includes a plurality of proactive damping structures mounted on a powertrain structure of the vehicle. Each proactive damping structure includes a magneto rheological elastomer (MRE). An electromagnet is associated with each proactive damping structure. A control unit is provided and includes a processor circuit. At least one sensor is constructed and arranged to obtain vibration data regarding the powertrain structure. The at least one sensor is electrically connected with the control unit. A LIDAR sensor is mounted on the vehicle and is electrically connected with the control unit. The LIDAR sensor is constructed and arranged to provide data to the control unit indicative of upcoming road surface conditions to be experienced by the vehicle. Based on data from at the least one sensor and the LIDAR sensor, the processor circuit is constructed and arranged to proactively control voltage to the electromagnets to selectively adjust a rigidity of the associated proactive damping structure so as to control vibrational effects on the powertrain structure.

In accordance with another aspect of an embodiment, a method of proactive damping of a vehicle provides a plurality of proactive damping structures mounted on a powertrain structure. Each proactive damping structure includes a magneto rheological elastomer (MRE). An electromagnet is associated with each proactive damping structure. Vibration data regarding the powertrain structure is monitored. Upcoming road surface conditions to be experienced by the vehicle are monitored. Based on the monitored vibration data and the upcoming road surface conditions, the voltage to the electromagnets is proactively controlled to selectively adjust a rigidity of the associated proactive damping structure so as to control vibrational effects on the powertrain structure.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE EXEMPLARY EMBODIMENTS

Figure 1:
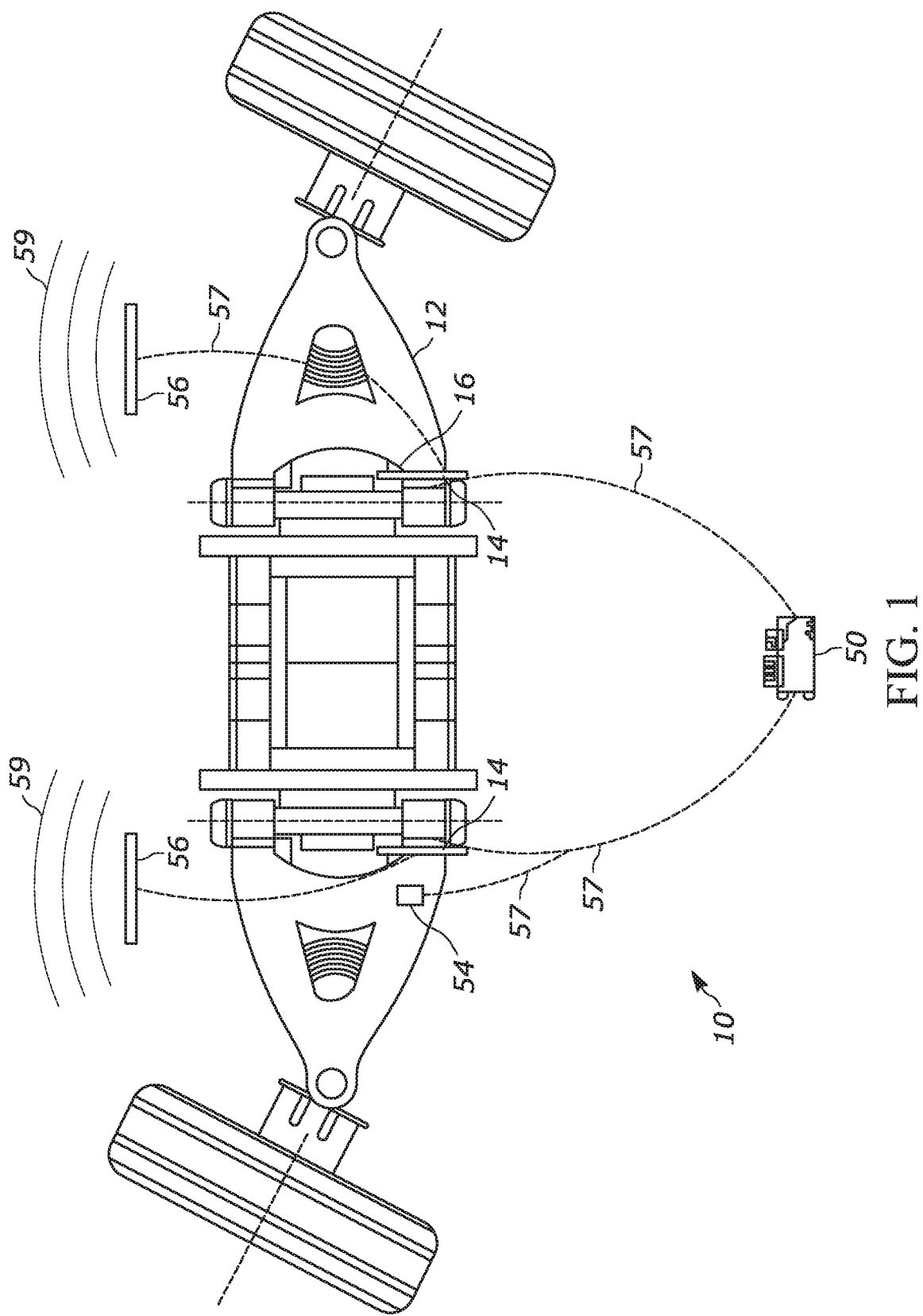
FIG. 1 is a plan view of a double wishbone vehicle suspension having proactive clamp structure as part of a proactive damping system, in accordance with an embodiment.
Figure 2:
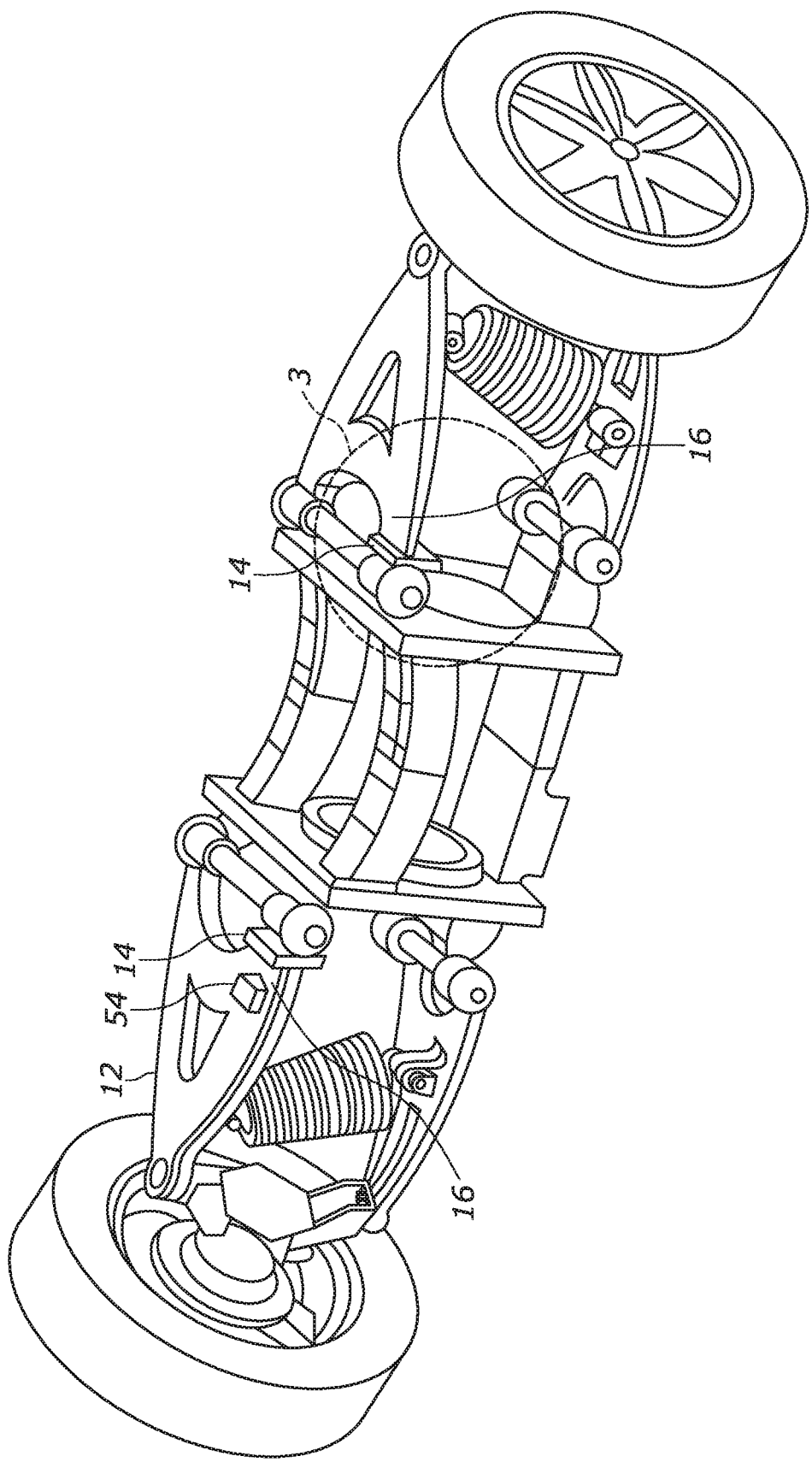
FIG. 2 is a perspective view of the double wishbone vehicle suspension having the proactive clamp structure of FIG. 1, shown mounted near wishbone joints in accordance with an embodiment.
Figure 3:
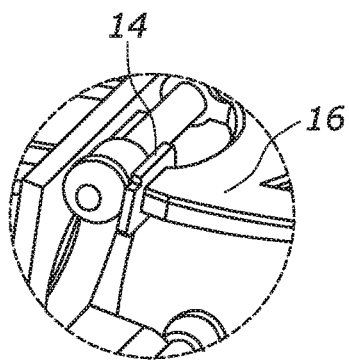
FIG. 3 is an enlarged view of the portion encircled at 3 in FIG. 2, showing a mounting location of a proactive clamp structure of an embodiment.

With reference to FIG. 1, a plan view of a proactive damping system is shown, generally indicated at 10, in accordance with an embodiment. The system 10 includes a powertrain structure including a vehicle suspension 12, preferably of the double wishbone type, having at least one proactive clamp structure 14. FIG. 2 is a perspective view of the double wishbone vehicle suspension 12 of FIG. 1 showing the proactive clamp structure 14 shown mounted near wishbone joints 16, with FIG. 3 showing an enlarge view of a proactive clamp structure 14 of FIG. 2. The powertrain structure also includes a chassis 32 as will described below with regard to FIG. 6.

Figure 4:
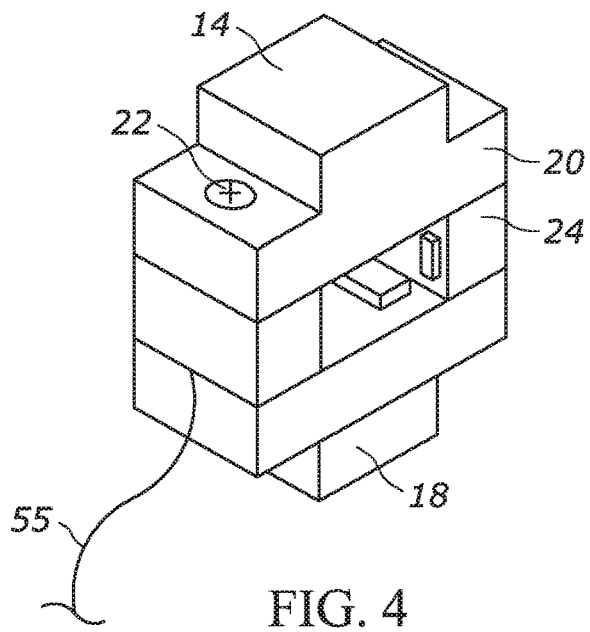
FIG. 4 is an enlarged view of a view of a proactive clamp structure in accordance with an embodiment.
Figure 5:
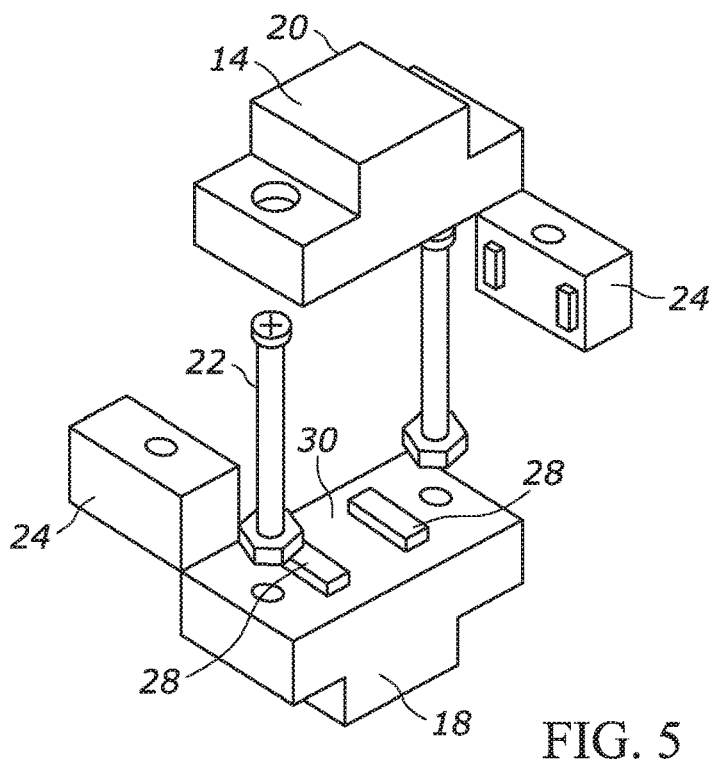
FIG. 5 is an exploded view of the proactive clamp structure of FIG. 4.

With reference to FIGS. 4 and 5, an example of a proactive clamp structure 14 is shown. The proactive clamp structure 14 includes a first body 18 and a second body 20 joined together via fasteners 22 so as to clamp on elastomer mountings 24 and the portion 26 of the suspension 12 there-between. MRE (Magneto Rheological Elastomer) 28 is provided in a recess defined in a face 30 of the body 18. The MRE is preferably of the type disclosed in U.S. Pat. No. 7,584,685, the content of which is hereby incorporated by reference into this specification. The elastomer mountings 24 are connected with the MRE 28. The proactive clamp structure 14 is constructed and arranged to provide active damping control in two axes, Z and X or Z and Y. Thus, the proactive clamp structure 14 working with the MRE 28 surrounds the portion 26 of the suspension 12 to be vibration controlled. Electromagnets (not shown) are embedded within the proactive clamp structure 14 to actuate the MRE 28. Thus, when a magnetic force is applied, via the electromagnets, to the MRE 28, the elastomer mounting 24 will be adjusted to engage the portion 26 to minimize or mitigate the effects of high amplitude impact to the portion 26 of the suspension 12. Control of the MRE 28 will be explained more fully below.

Figure 6:
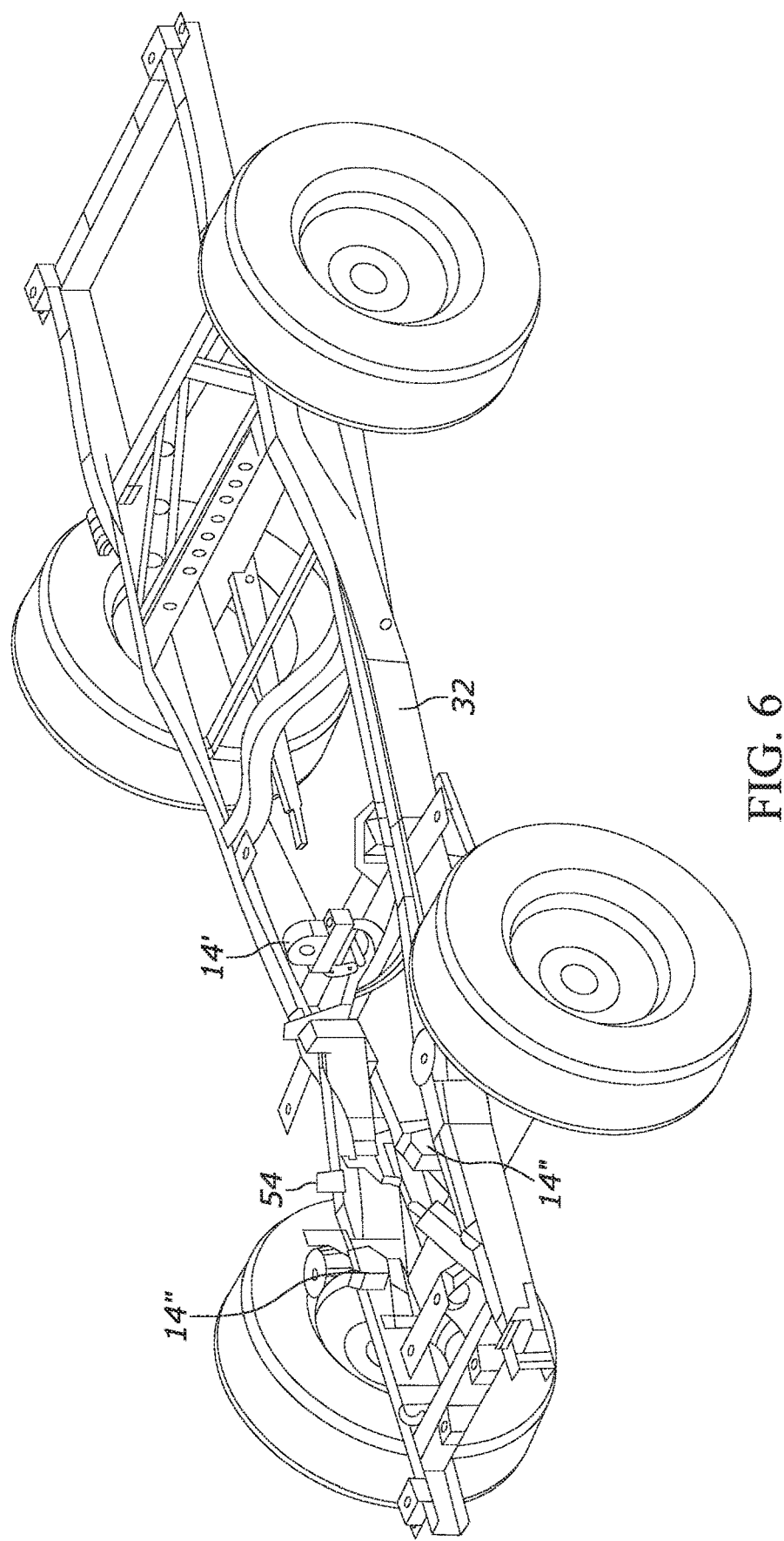
FIG. 6 is a perspective view of a vehicle chassis having a proactive damping structure as part of the system of the embodiment.
Figure 7:
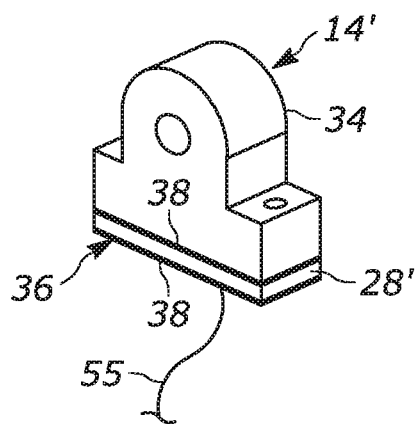
FIG. 7 is an enlarged view of proactive damping structure of FIG. 6 in the form of a proactive shaft bearing.

To provide further damping, with reference to FIG. 6, the system 10 can also include proactive damping structure 14', 14" on the powertrain structure that includes the chassis 32. As shown in FIGS. 6 and 7, the proactive damping structure 14' is in the form of a proactive shaft bearing structure which comprises a ball bearing 34 mounted on an active mounting structure, generally indicated at 36. Mounting structure 36 includes MRE 28' provided between two electromagnets 38. When the electromagnets are activated, the magnetic field acts on the MRE 28' so as to actively control the structural vibrations to the transmission shaft (not shown) in order to reduce damages from misalignments, and improve the efficiency of the transmission system of the vehicle. Thus, proactive damping structure 14' functions as a shock absorber for the transmission shaft.

Figure 8:
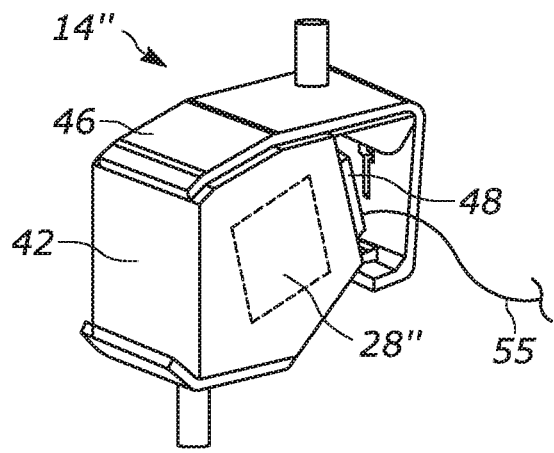
FIG. 8 is an enlarged view of proactive damping structure of FIG. 6 in the form of a proactive engine mount.

With reference to FIGS. 6 and 8, the proactive damping structure 14" is in the form of a proactive engine mount constructed and arranged to support a portion of an engine (not shown) of the vehicle. The proactive engine mount 14" comprises an elastomer shock absorber member 42 with MRE 28" inside a chamber thereof. The member 42 is fixed in a metal housing 46, upon which a portion of the vehicle's engine rests. The damping structures 14" containing MRE 28" inside, which, when exposed to a magnetic field generated by electromagnet 48, helps to reduce undesired vibrations that could damage the engine and the mounting structure thereof. Thus, the proactive damping structure 14" functions as a shock absorber for the engine.

The electromagnets described herein are conventional and can be integral with or separate from each of the active damping structures 14, 14' and 14". Varying voltage applied to the electromagnets controls the strength of the magnetic field which in turn controls the spring rate of the MRE.

Figure 9:
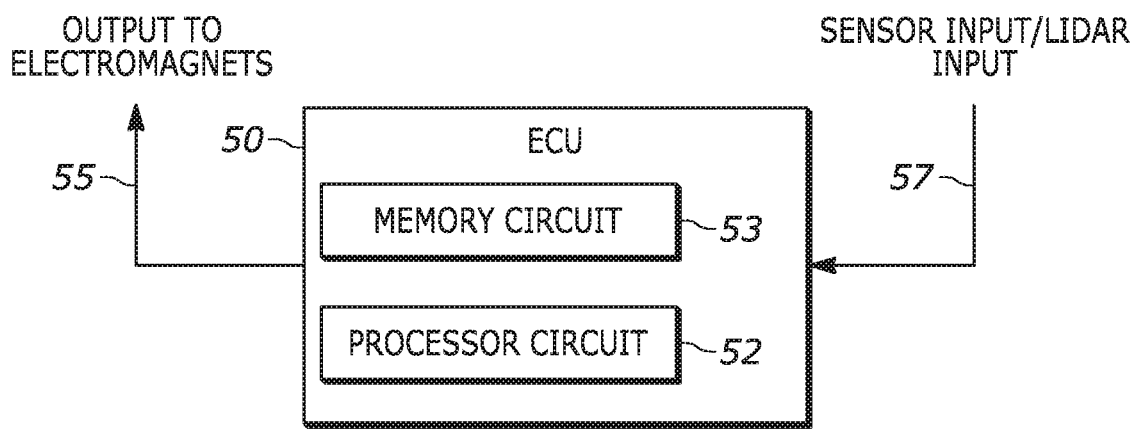
FIG. 9 is a schematic view of the electronic control unit of the system of FIG. 2.

Returning to FIG. 1, now that the proactive damping structures 14, 14' and 14" of the embodiment have been described, control of these damping structures will be explained. The system 10 includes an electronic control unit (ECU) 50 having a processor circuit 52 and a memory circuit 53. A schematic illustration of the ECU 50 is shown in FIG. 9. Each of the electromagnets of the respective active damping structures 14, 14' and 14" is electrically connected to the ECU 50 via wiring 55. The ECU 50 conventionally monitors data from accelerometers 54, located near the area of interest such as on the suspension 12. These signals are used by an algorithm executed by the processor circuit 52 for controlling the electromagnets in structure 14, the electromagnets 38 in structure 14' and the electromagnets 48 in structure 14". Thus, the accelerometers 54 provide the actual vibrational response data via wiring 57 to the ECU 50. Still further, the system 10 incudes at least one 3D flash LIDAR sensor 56 mounted on the vehicle that sensed an area 59 in front of the vehicle. The LIDAR sensor 56 thus provides a signal to the ECU 10 regarding the upcoming road surface conditions so that in case of imperfections such as bumps, the algorithm executed by the processor circuit 52 can use the data from the accelerometer 54 along with the LIDAR sensor 56 data to selectively activate the electromagnets in a proactive manner in order proactively control the rigidity of the associated active damping structure 14, 14' and 14" to protect powertrain components from damage.

The algorithm executed by the processor circuit 52 not only processes sensor signals and controls the electromagnets and thus the proactive damping structures as noted above, but it also predicts possible structural damage by means of historic records of transmission vibration events and by pre-loaded vibration profiles from actual driving tests that are stored in memory circuit 53.

Thus, the system 10 extends the lifespan and improves the performance of the powertrain system elements, and at the same time, provides an active/pro-active system for controlling the vibrational effects on the powertrain components. Due to the nature of the application, the use of a semi-rigid matrix for the MRE shock absorbers is preferred.

The operations and algorithms described herein can be implemented as executable code within the ECU 50 having the processor circuit 52 as described, or stored on a stand-alone computer or machine readable non-transitory tangible storage medium that are completed based on execution of the code by a processor circuit implemented using one or more integrated circuits. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a micro-processor circuit (not shown) and implemented using one or more integrated circuits, where execution of executable code stored in an internal memory circuit 53 causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 53 can be implemented, for example, using a non-volatile memory such as a programmable read only memory (PROM) or an EPROM, and/or a volatile memory such as a DRAM, etc.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A vehicle powertrain proactive damping system, comprising:
    a plurality of shock absorbers mounted on a powertrain structure of a vehicle including a chassis and a suspension of the vehicle, each shock absorber comprising:
        a magneto rheological elastomer (MRE),
        a proactive clamp structure constructed and arranged to provide active damping control in two axes and to clamp on a portion of the suspension to be vibration controlled, and
        an electromagnet embedded within the proactive clamp structure to actuate the MRE,
    a control unit including a processor circuit,
    at least one sensor constructed and arranged to obtain vibration data regarding the powertrain structure, the at least one sensor being electrically connected with the control unit, and
    a LIDAR sensor mounted on the vehicle and electrically connected with the control unit, the LIDAR sensor being constructed and arranged to provide data to the control unit indicative of upcoming road surface conditions to be experienced by the vehicle,
    wherein, based on data from at the least one sensor and the LIDAR sensor, the processor circuit is constructed and arranged to proactively control voltage to the electromagnets to selectively adjust a rigidity of the associated shock absorber to control vibrational effects on the powertrain structure, and
    wherein the plurality of shock absorbers includes a proactive shaft bearing structure constructed and arranged to engage a transmission shaft and the processor circuit is configured to proactively control voltage to the electromagnets to proactively selectively adjust a rigidity of the proactive shaft bearing structure.

2. The system of claim 1, wherein the proactive clamp structure includes a first body and a second body joined together via fasteners so as to clamp on elastomer mountings and the portion of the suspension there-between, and
    wherein the MRE is provided in a recess defined in a face of one of the first body and the second body.

3. The system if claim 1, wherein the proactive shaft bearing structure comprises a ball bearing mounted on an active mounting structure, and
    wherein the MRE is provided in the mounting structure.

4. The system of claim 1, wherein the plurality of shock absorbers includes a proactive engine mount constructed and arranged to support a portion of an engine of the vehicle.

5. The system of claim 4, wherein the proactive engine mount comprises of an elastomer shock absorber member with the MRE disposed inside a chamber thereof.

6. The system of claim 1, wherein the at least one sensor is an accelerometer.

7. A method of proactive damping of a vehicle, the vehicle having a powertrain structure including a chassis and a suspension of the vehicle, the method comprising:
    providing a plurality of shock absorbers mounted on the powertrain structure, each shock absorber comprising a magneto rheological elastomer (MRE), a proactive clamp structure constructed and arranged to provide active damping control in two axes and to clamp on a portion of the suspension to be vibration controlled, and an electromagnet embedded within the proactive clamp structure to actuate the MRE,
    monitoring vibration data regarding the powertrain structure,
    monitoring upcoming road surface conditions to be experienced by the vehicle, and
    based on the monitored vibration data and the upcoming road surface conditions, proactively controlling voltage to the electromagnets to selectively adjust a rigidity of the associated shock absorber so as to control vibrational effects on the powertrain structure,
    wherein the controlling comprises proactively adjusting rigidity of a proactive shaft bearing structure constructed and arranged to engage a transmission shaft.

8. The method of claim 7, wherein the plurality of shock absorbers
    include a proactive engine mount constructed and arranged to support a portion of an engine of the vehicle.

9. The method of claim 7, wherein monitoring the upcoming road conditions comprises a LIDAR sensor mounted on the vehicle monitoring the upcoming road conditions.

10. The method of claim 7, wherein monitoring the vibration data comprises an accelerometer monitoring the vibration data.

11. The method of claim 7, further comprising:
    establishing a historical record of vibration events on the powertrain structure, providing known vibration profiles from actual driving tests, and
    based on the historical data and vibration profiles, predicting structural damage to the powertrain structure.

* * * * *